United States Patent
Talty et al.

(10) Patent No.: US 10,525,880 B2
(45) Date of Patent: Jan. 7, 2020

(54) HEARING IMPAIRED DRIVER DETECTION AND ASSISTANCE SYSTEM

(71) Applicant: GM GLOBAL TECHNOLOGY OPERATIONS LLC, Detroit, MI (US)

(72) Inventors: Timothy J. Talty, Beverly Hills, MI (US); Gregg R. Kittinger, Oakland Township, MI (US); David R. Petrucci, Warren, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 78 days.

(21) Appl. No.: 15/726,714

(22) Filed: Oct. 6, 2017

(65) Prior Publication Data

US 2019/0106056 A1    Apr. 11, 2019

(51) Int. Cl.
| | |
|---|---|
| *H04N 7/18* | (2006.01) |
| *B60Q 9/00* | (2006.01) |
| *G08G 1/0965* | (2006.01) |
| *H04R 25/00* | (2006.01) |
| *G06K 9/00* | (2006.01) |
| *B60R 1/12* | (2006.01) |

(52) U.S. Cl.
CPC .......... *B60Q 9/00* (2013.01); *G06K 9/00832* (2013.01); *G06K 9/00845* (2013.01); *G08G 1/0965* (2013.01); *H04R 25/30* (2013.01); *H04R 25/554* (2013.01); *B60R 1/12* (2013.01); *B60R 2001/1253* (2013.01); *H04R 2499/13* (2013.01)

(58) Field of Classification Search
CPC .. B60Q 9/00; G06K 9/00832; G06K 9/00845; H04R 25/554; H04R 25/30; H04R 2499/13; G08G 1/0965; B60R 2001/1253; B60R 1/12
See application file for complete search history.

(56) References Cited

U.S. PATENT DOCUMENTS

| | | | |
|---|---|---|---|
| 9,272,689 B2 | 3/2016 | Fung et al. | |
| 9,893,697 B1* | 2/2018 | Churchwell, II | ........ H03G 3/32 |
| 2003/0085799 A1* | 5/2003 | Ghabra | ............... B60C 23/0444 |
| | | | 340/5.72 |
| 2008/0319616 A1 | 12/2008 | Federspiel et al. | |
| 2011/0159851 A1 | 6/2011 | Chrumka et al. | |
| 2015/0023536 A1* | 1/2015 | Scheller | ................. H04R 25/30 |
| | | | 381/315 |
| 2016/0267335 A1 | 9/2016 | Hampiholi | |

* cited by examiner

*Primary Examiner* — Richard T Torrente
(74) *Attorney, Agent, or Firm* — Lorenz & Kopf, LLP

(57) ABSTRACT

A method includes determining, with an on-board vehicle hardware system, if a hearing assistance device is in use within a vehicle. The method also includes providing a notification, through a vehicle infotainment system, when the hearing assistance device is in use. The notification provides a vehicle operator with a prompt for activating an external environment amplification system.

4 Claims, 3 Drawing Sheets

HEARING IMPAIRED DRIVER DETECTION AND ASSISTANCE SYSTEM

FIELD

The present disclosure relates generally to driver assistance systems, and more particularly to a hearing impaired driver detection and assistance system.

INTRODUCTION

The statements in this section merely provide background information related to the present disclosure and may not constitute prior art.

Many modern vehicles include sophisticated electronic systems designed to increase the safety, comfort and convenience of the occupants. Among these systems are wireless technologies embedded so as to provide hands-free capabilities for vehicle occupants. Notably, many of these systems can be modified to communicate with implanted and external biomedical devices in order to enhance the driving experience.

SUMMARY

A method includes determining, with an on-board vehicle hardware system, if a hearing assistance device is in use within a vehicle. The method also includes providing a notification, through a vehicle infotainment system, when the hearing assistance device is in use. The notification provides a vehicle operator with a prompt for activating an external environment amplification system.

In some embodiments, the on-board vehicle hardware system is a broadband antenna and detection circuit embedded within a vehicle seat. The broadband antenna and detection circuit can further include a telecoil arranged within a headrest of the vehicle seat and it can communicate directly with a telecoil of the hearing assistance device. Furthermore, the broadband antenna and detection circuit may also detect a radio frequency signal change indicating that the hearing assistance device is in use. In addition, the on-board vehicle hardware system can be a cabin-view camera system that performs a camera and video signal process to detect the presence of the hearing assistance device. Additionally, the external environment amplification system can amplify external emergency vehicle noises A computer-implemented method for detecting use of a hearing assistance device within a vehicle includes detecting, via an on-board vehicle hardware system, the usage of the hearing assistance device. A vehicle controller may be used to detect the presence of an emergency vehicle notification within a predefined area around the vehicle. An infotainment system is then used to provide a prompt for an audio or visual notification of the emergency vehicle notification.

In some embodiments, the on-board vehicle hardware system is a broadband antenna and detection circuit embedded within a vehicle seat. The broadband antenna and detection circuit may include a telecoil arranged within a headrest of the vehicle seat, which may communicate directly with a telecoil of the hearing assistance device. The audio notification may be an amplification of the emergency vehicle notification through a speaker of the infotainment system, while the visual notification may be an image or a flashing light on a screen of the infotainment system. Furthermore, the on-board vehicle hardware system is a cabin-view camera system that performs a camera and video signal process to detect the presence of the hearing assistance device.

A method includes determining, via an on-board vehicle hardware system, if a hearing assistance device is in use within a vehicle. The method also includes determining, via a vehicle controller, the presence of a driving hazard within a predefined area around the vehicle. Predefined external sounds are then amplified through a vehicle device, when it is determined that the hearing assistance device is in use within the vehicle.

In some embodiments, the predefined external sounds are one of local ordinances, driving conditions, and emergency broadcast information. Furthermore, the vehicle device is one of an infotainment system and a telecoil arranged within a headrest of a vehicle seat. Additionally, the on-board vehicle hardware system is at least one of a broadband antenna and detection circuit embedded within a vehicle seat and a cabin-view camera system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
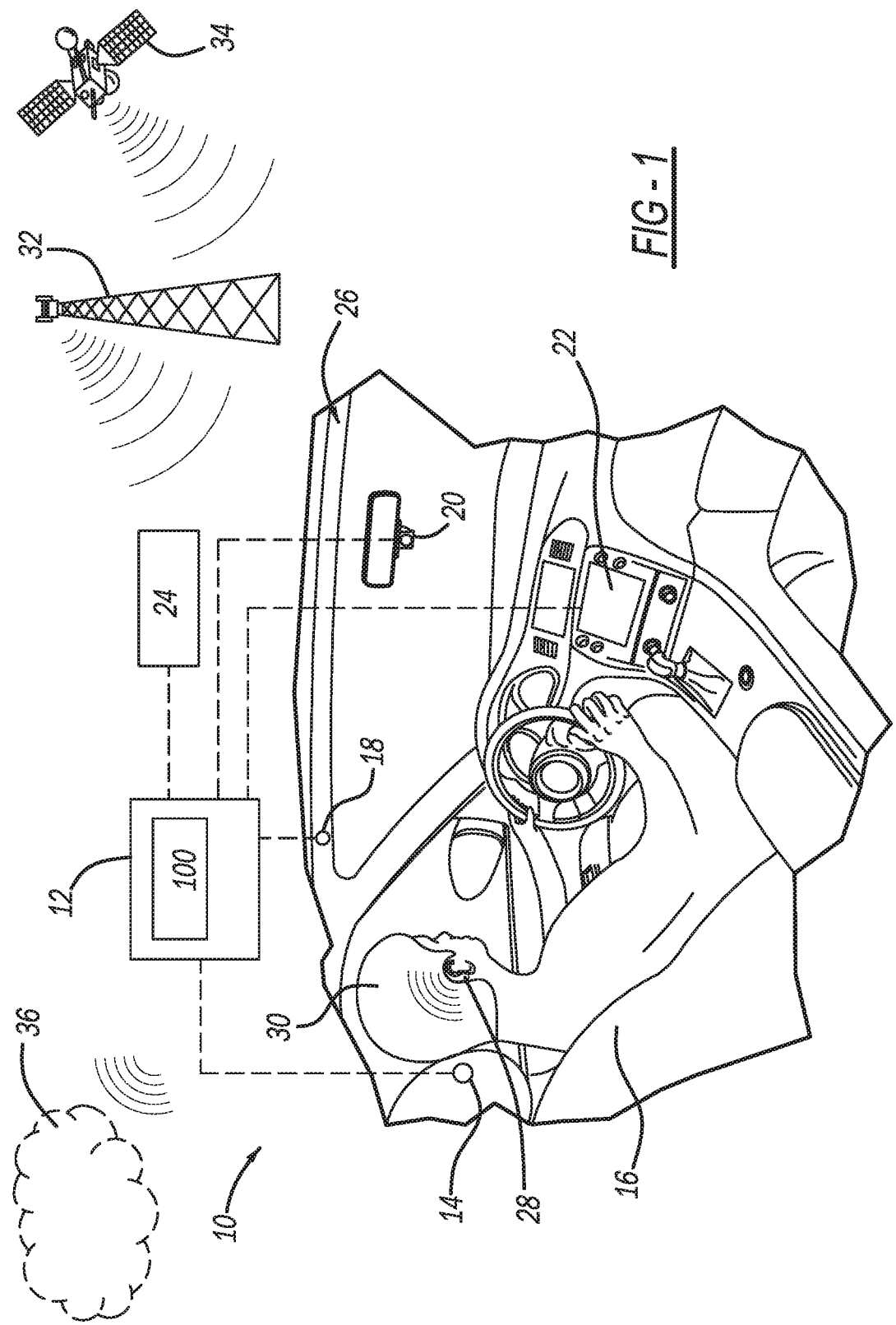
FIG. 1 is a perspective view of a vehicle interior according to the present disclosure.

The following description is merely exemplary in nature and is not intended to limit the present disclosure, application, or uses. Furthermore, there is no intention to be bound by any expressed or implied theory presented in the preceding field, introduction, summary or the following detailed description. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications. Conventional techniques and components related to vehicle electrical and mechanical parts and other functional aspects of the system (and the individual operating components of the system) may not be described in detail herein for the sake of brevity. It should be noted, however, that many alternative or additional functional relationships or physical connections may be present in an embodiment of the invention.

Additionally, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The following description also refers to elements or features being "connected" or "coupled" together. As used herein, these terms refer to one element/feature being directly or indirectly joined to (or directly or indirectly communicating with) another element/feature, but not necessarily through mechanical means. Furthermore, although the schematic diagrams shown herein depict example arrangements of elements, additional intervening elements, devices, features, or components may be present in an actual embodiment.

With reference now to FIG. 1, an exemplary vehicle 10 is shown having an electronic control unit (ECU) 12 communicating with a broadband antenna and detection circuit 14 embedded within a vehicle seat 16, an interior microphone system 18 having at least one microphone, a cabin-view camera system 20 having at least one camera, and an infotainment system 22. The ECU 12 may also communicate with other vehicle systems 24, including but not limited to, a cruise control system, a collision warning system, a collision mitigation braking system, an auto cruise control system, a lane departure warning system, a lane keep assist system, a navigation system, and various other vehicle sensors, such as those arranged inside a vehicle cabin 26.

The ECU 12 may further incorporate a detection and notification algorithm 100 that may be used to detect the presence of a hearing assistance device 28 in use by a vehicle driver 30. The detection and notification algorithm 100 may also be used to inform the vehicle driver 30 or other interested party (e.g., paramedic, police) of the driver's reliance on the hearing assistance device 28, with optional assistance for activating amplification technologies. In this regard, the ECU 12 may also communicate with external sources (e.g., with a remote wireless communications system 32 and/or with a remote satellite system 34). The ECU 12 monitors and processes available information from the aforementioned sources, including information available from the remote systems 32, 34 regarding the external environment (e.g., local ordinances, driving conditions, emergency broadcast information). While the functions of the detection and notification algorithm 100 are described as being completed within the ECU 12 (e.g., on-board), the processing steps may also be completed at a remote location (e.g., server 36).

Figure 2:
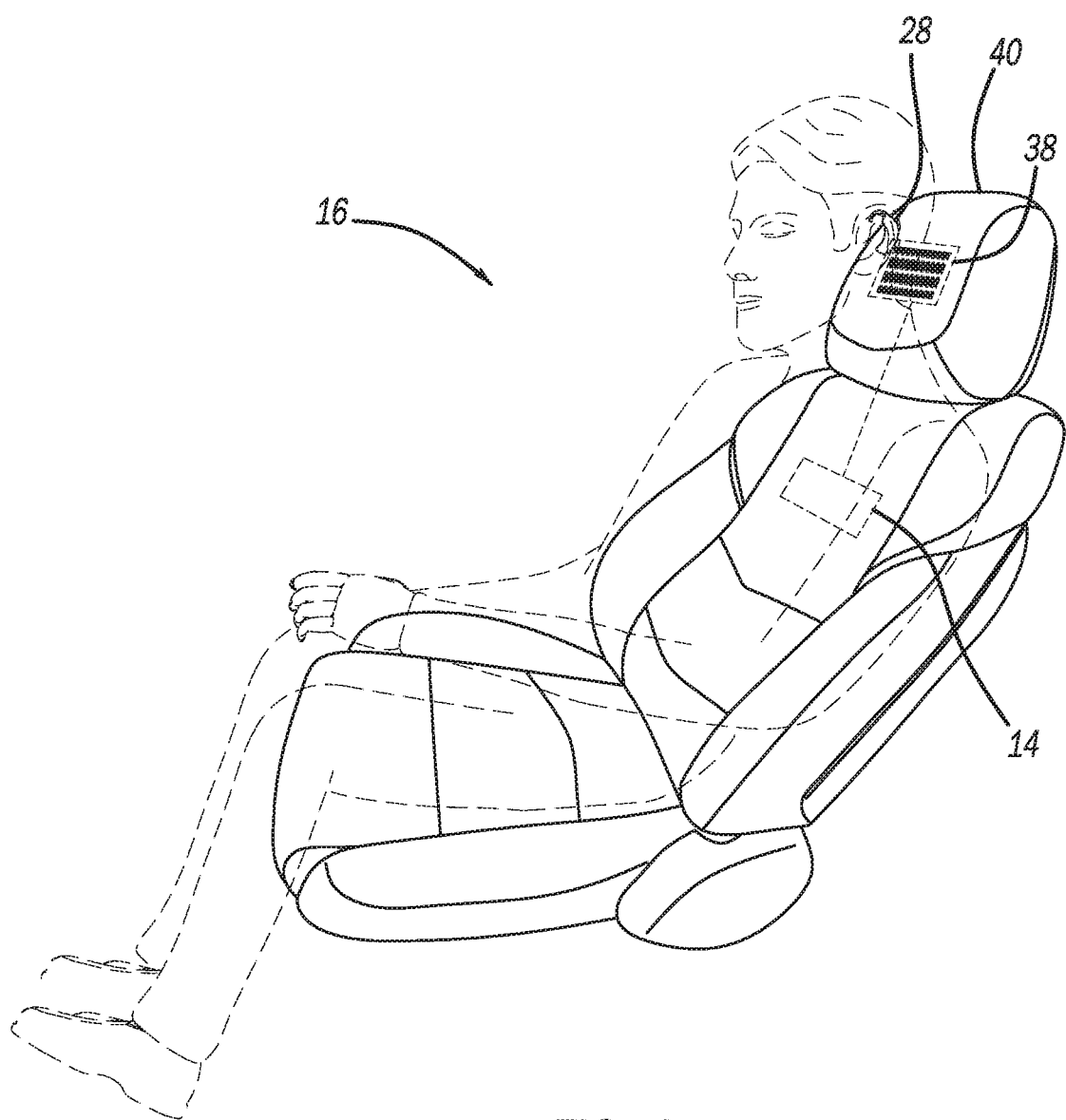
FIG. 2 is a perspective view of a vehicle seat having an embedded hardware system.

Referring now to FIG. 2, an exemplary embodiment utilizes the broadband antenna and detection circuit 14 embedded within the vehicle seat 16 to perform a radio frequency detection of the hearing assistance device 28. In particular, the broadband antenna and detection circuit 14 may have a coil feature 38 arranged within a headrest 40 of the vehicle seat 16. The coil feature 38 may operate as a passive antenna structure. While described as being located within the vehicle seat 16, and particularly within the headrest 40, it should be understood that the coil feature 38 of the broadband antenna and detection circuit 14 may be arranged anywhere within the vehicle cabin 26 (e.g., within an upper portion of seatback, a headliner, a B-pillar, a door frame, and/or a sun visor) in order to adequately and consistently determine the presence of a hearing assistance device 28 in use by the vehicle driver 30.

Figure 3:
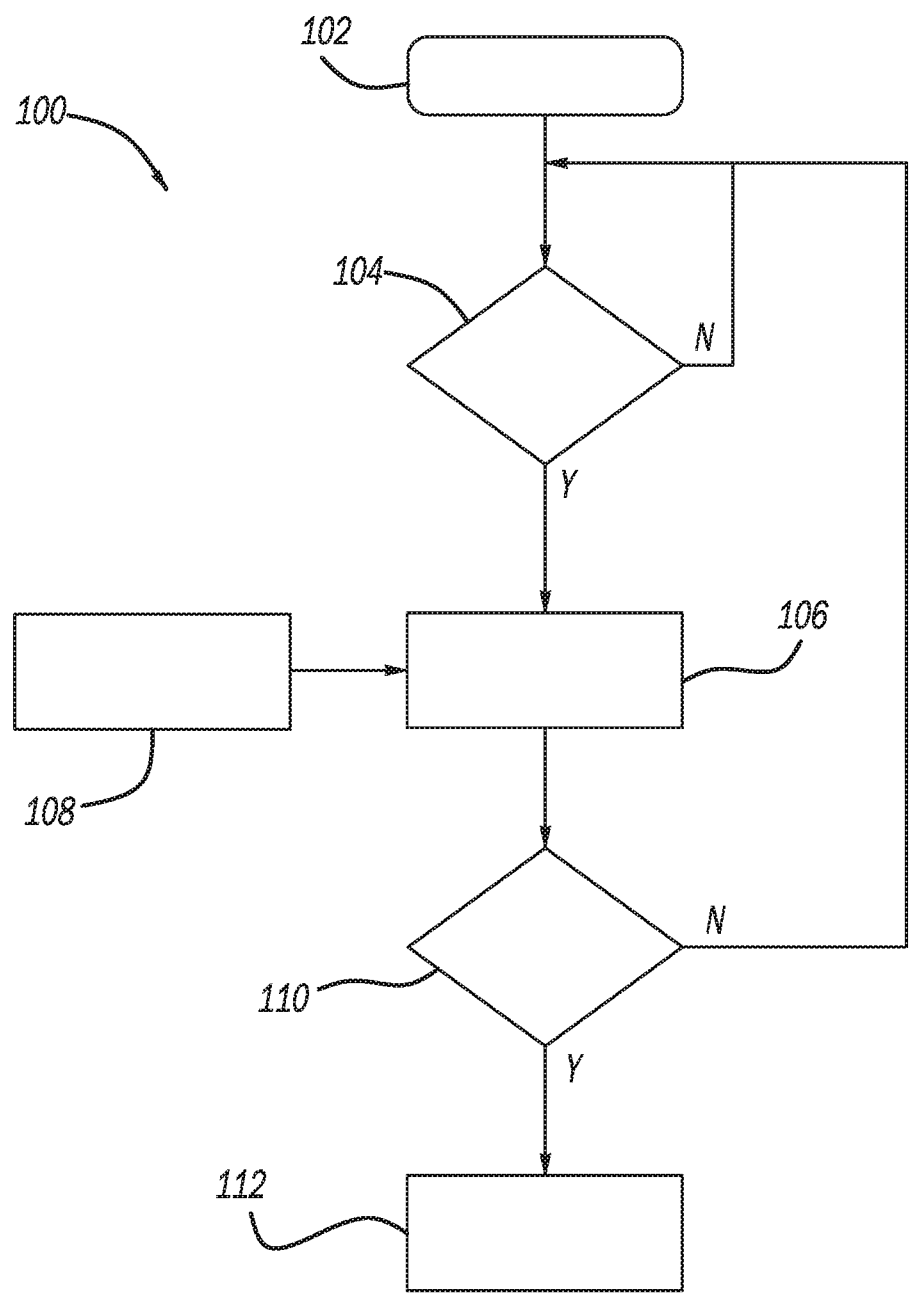
FIG. 3 is a block diagram for an exemplary detection and assistance algorithm using the embedded hardware system of FIG. 2.

When the vehicle 10 is in motion, the ECU 12 may initiate the detection and notification algorithm 100 (Step 102) as shown in FIG. 3. While the detection and notification algorithm 100 is described as being initiated by vehicle motion, it may also be initiated by other vehicular operations (e.g., initiated upon vehicle start). As another example, the interior microphone system 18 may be tuned to identify the presence of emergency vehicle notifications (e.g., sirens) in the vicinity of the vehicle, in order to initiate the detection and notification algorithm 100. At step 104, the broadband antenna and detection circuit 14 determines if the vehicle driver 30 has a hearing assistance device 28 through a radio frequency (RF) detection. The broadband antenna and detection circuit 14 detects a RF signal change indicating that the vehicle driver 30 is using the hearing assistance device 28. If no RF signal change is detected, the process continues in a loop until a RF signal change is detected. Once a RF signal change is detected, the process continues to Step 106 where a tuning function is activated. The tuning function may receive inputs 108 relating to the state of the vehicle 10 and to the preferences of the vehicle driver 30. As an example only, the vehicle driver 30 may prefer to preemptively cancel any and all notifications (e.g., through an initial "no notification requested" option during infotainment setup). Alternately, the vehicle driver 30 may preemptively request notification to proceed through various methods (e.g., audio, visual).

When prompted for additional assistance at Step 110, the vehicle driver 30 may choose to decline assistance. In this case, the algorithm may again restart and continue in a loop until another RF signal change is detected or if the system is otherwise activated. If, however, the vehicle driver 30 chooses to accept the feature assistance, an enablement of an external environment amplification system will be initiated at Step 112. In this way, the vehicle driver 30 can be prompted to interact with the vehicle's infotainment system 22 and can be assisted in establishing the preferred method for notification (e.g., audio, visual) and the level of amplification that is required (e.g., volume for audio notifications or number of visual notifications preferred), which improve driver attention to the external environment (e.g., local ordinances, driving conditions, emergency broadcast information), while reducing driver distraction and improving driver satisfaction. As an example, the vehicle driver 30 may choose to receive an audio notification through a speaker of the infotainment system, such as a keyword corresponding to the type of external sound that has been detected (e.g., "POLICE VEHICLE APPROACHING" when police sirens are detected). As another example, the vehicle driver 30 may choose to receive a visual notification, such as a flashing light or an image on a screen of the infotainment system, corresponding to the type of external sound that has been detected (e.g., image of caduceus when an ambulance is approaching).

It should also be understood that the broadband antenna and detection circuit 14 may also communicate directly with the hearing assistance device 28 through the coil feature 38. In this way, the coil feature 38 can be tuned to the frequency of the hearing assistance device 28 in order to provide information directly to the vehicle driver 30 (e.g., telecoil-to-telecoil communication).

As previously discussed, the detection and notification algorithm 100 may also be preset to establish values for the feature assistance (e.g., indication of which method of notification is preferred or what level of notification is required). Notably, the detection and notification algorithm 100 can also inform the vehicle driver 30 of possible upcoming driving hazards, by merely amplifying external emergency vehicle noises through a speaker of the vehicle's infotainment system 22 when the hearing assistance device 28 is deemed to be in use.

It should be understood that other methods may be used to identify to the need for hearing assistance within the vehicle, with or without the presence of the hearing assistance device 28. As an example, the active safety feature, lane keep assist, active braking, or the like may be used to ascertain delayed response behaviors related to auditory deficiencies. As yet another example, the cabin-view camera system 20 may be used to visually identify the hearing assistance device 28 in use on the vehicle driver 30.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

Embodiments of the present disclosure are described herein. This description is merely exemplary in nature and, thus, variations that do not depart from the gist of the disclosure are intended to be within the scope of the disclosure. For example, the disclosure may also be utilized in non-automotive environments where a distracted operator notification system is beneficial, such as with industrial equipment.

What is claimed is:

1. A method comprising:
   determining, with an on-board vehicle hardware system, if a hearing assistance device is in use within a vehicle, wherein the on-board vehicle hardware system includes a broadband antenna and detection circuit, including a telecoil for communicating directly with the hearing assistance device, arranged within a headrest of a vehicle seat; and
   providing a notification, through a vehicle infotainment system, when the hearing assistance device is in use, wherein the notification provides a vehicle operator with a prompt for activating an external environment amplification system wherein the external environment amplification system amplifies external emergency vehicle noises.

2. The method of claim 1, wherein the broadband antenna and detection circuit detects a radio frequency signal change indicating that the hearing assistance device is in use.

3. The method of claim 1, wherein the on-board vehicle hardware system is a cabin-view camera system.

4. The method of claim 3, wherein the cabin-view camera system performs a camera and video signal process to detect the presence of the hearing assistance device.

\* \* \* \* \*